United States Patent
Wu et al.

(10) Patent No.: US 10,302,863 B2
(45) Date of Patent: May 28, 2019

(54) METHODS OF ATTACHING SURFACES TOGETHER BY ADHESIVES, AND DEVICES INCLUDING SURFACES ATTACHED TOGETHER BY ADHESIVES

(71) Applicant: ams Sensors Singapore Pte. Ltd., Singapore (SG)

(72) Inventors: Guo Xiong Wu, Singapore (SG); Cris Calsena, Singapore (SG); James Eilertsen, Pittsford, NY (US); Qichuan Yu, Singapore (SG); Tobias Senn, Zurich (CH); Han Nee Ng, Singapore (SG)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/587,687

(22) Filed: May 5, 2017

(65) Prior Publication Data
US 2017/0322376 A1  Nov. 9, 2017

Related U.S. Application Data

(60) Provisional application No. 62/332,619, filed on May 6, 2016.

(51) Int. Cl.
*G02B 6/13* (2006.01)
*G02B 6/42* (2006.01)
(Continued)

(52) U.S. Cl.
CPC .............. *G02B 6/13* (2013.01); *B29C 65/48* (2013.01); *G02B 6/4214* (2013.01);
(Continued)

(58) Field of Classification Search
CPC ........ G02B 6/13; G02B 6/138; G02B 6/4239; G02B 6/424; G02B 6/4244; B29C 65/48
(Continued)

(56) References Cited

U.S. PATENT DOCUMENTS 4,235,512 A * 11/1980 Brasfield ................ G02B 5/128
359/541
5,942,062 A *  8/1999 Hassall ............... B32B 37/1292
156/275.5
(Continued)

FOREIGN PATENT DOCUMENTS

WO  WO 2016/076797  5/2016

*Primary Examiner* — Robert Tavlykaev
(74) *Attorney, Agent, or Firm* — Fish & Richardson P.C.

(57) ABSTRACT

The present disclosure describes methods of attaching surfaces together. In one aspect, a method includes depositing a first adhesive onto a first surface of a first item, the first adhesive forming a pattern that at least partially surrounds a region of the first surface where there is no first adhesive. A second adhesive is jetted onto the region of the first surface, wherein the second adhesive has a viscosity lower than a viscosity of the first adhesive. The first surface of the first item and a second surface of a second item are brought into contact with one another. The method also includes curing the first and second adhesives. While the methods can be particularly suitable for manufacturing optical light guide elements, the methods also can be used in other contexts and applications as well.

14 Claims, 10 Drawing Sheets

(51) Int. Cl.
   *B29C 65/48* (2006.01)
   *G02B 6/12* (2006.01)
   *F16B 11/00* (2006.01)
(52) U.S. Cl.
   CPC .......... *G02B 6/4239* (2013.01); *F16B 11/006* (2013.01); *G02B 2006/121* (2013.01)
(58) Field of Classification Search
   USPC .............................................. 385/14, 33, 36
   See application file for complete search history.

(56)  References Cited

U.S. PATENT DOCUMENTS

| | | | |
|---|---|---|---|
| 6,293,711 B1* | 9/2001 | Sasaki ................... | G02B 6/4202 385/88 |
| 7,708,614 B2* | 5/2010 | Harada ................ | H01L 51/5253 313/512 |
| 9,719,848 B2* | 8/2017 | Kainuma ............... | G01J 1/0407 |
| 2014/0247597 A1* | 9/2014 | Abe ................... | H05B 33/0821 362/249.06 |
| 2015/0078704 A1* | 3/2015 | Kase .................... | G02B 6/4206 385/33 |

* cited by examiner

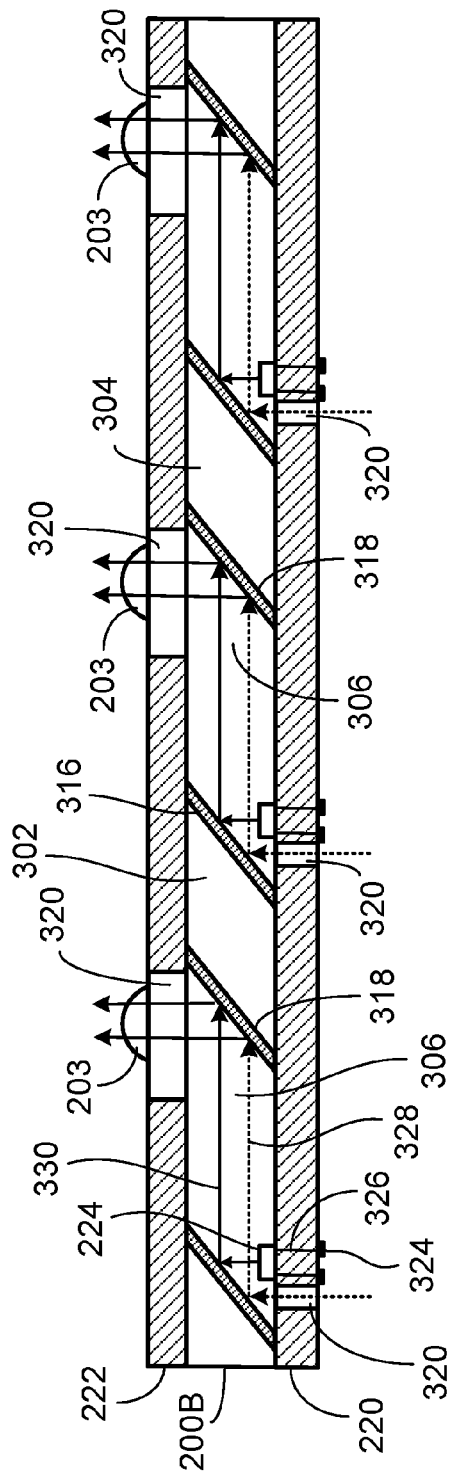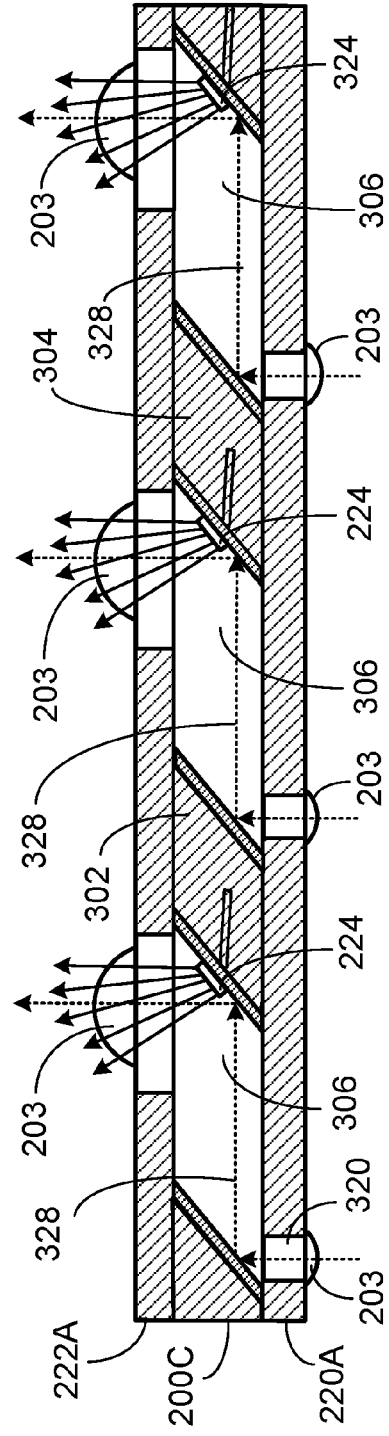

METHODS OF ATTACHING SURFACES TOGETHER BY ADHESIVES, AND DEVICES INCLUDING SURFACES ATTACHED TOGETHER BY ADHESIVES

FIELD OF THE DISCLOSURE

The present disclosure relates to methods of attaching surfaces together by adhesive, and devices that include surfaces attached to one another by adhesives.

BACKGROUND OF THE DISCLOSURE

Miniaturized optical light guide elements are sometimes integrated, for example, into electronic devices such as smart phones and other portable computing devices such as portable computers, laptops, personal data assistants, tablet computers and the like. In some cases, the optical light guide elements can be manufactured, at least in part, at a wafer-level, which facilitates fabrication of many (e.g., hundreds or thousands) of optical light guide elements at the same time in parallel.

Manufacturing high-precision optical elements, such as optical light guide elements, in high volume (e.g., mass production) sometimes entails attaching together substantially flat surfaces. Adhesive is sometimes used to attach the surfaces and fix them to one another. However, when the surfaces are brought in contact with one another via the adhesive, very small air bubbles or other bonding voids may be introduced into the adhesive, which can reduce mechanical robustness. Further, as the surfaces are pressed together, adhesive may overflow onto optically sensitive or other components, which may become contaminated by the adhesive.

SUMMARY

The present disclosure describes methods of attaching surfaces together by adhesives, and devices that include surfaces attached to one another by adhesives. While the methods can be particularly suitable for manufacturing optical light guide elements, the methods also can be used in other contexts and applications as well.

In one aspect, the disclosure describes a method that includes depositing a first adhesive onto a first surface of a first item, the first adhesive forming a pattern that at least partially surrounds a region of the first surface where there is no first adhesive. The method includes jetting a second adhesive onto the region of the first surface, wherein the second adhesive has a viscosity lower than a viscosity of the first adhesive. The first surface of the first item and a second surface of a second item are brought into contact with one another. The method also includes curing the first and second adhesives.

Some implementations include one or more of the following features. For example, in some cases, the first adhesive has a viscosity of at least 8,000 mPas, and in some instances, has a viscosity in a range of 8,000 mPas to 20,000 mPas. In some implementations, the second adhesive has a viscosity equal to or less than 3,000 mPas. In some instances, the first and second adhesives are composed of the same material; however, the first adhesive is applied at a first temperature, and the second adhesive is applied at a second temperature different from the first temperature.

In some implementations, the first adhesive is applied to the first surface so as to cover corner areas of the first surface. In some instances, the first adhesive is applied to the first surface so as to laterally encircle the region of the first surface where there is no first adhesive. The first adhesive can be applied to the first surface so as to form a pattern such that there are one or more channels extending from the region of the first surface where there is no first adhesive. Such channels can, in some cases, facilitate removal of bubbles when the surfaces are pressed together.

Curing of the first and second adhesives can be performed in various ways. In some instances, the adhesives are cured at the same time. In some cases, the method includes curing the first adhesive by a first curing technique (e.g., thermally) and curing the second adhesive by a different second curing technique (e.g., UV radiation). Further, in some implementations, the method includes partially curing the first adhesive before jetting the second adhesive onto the region of the first surface, and curing the second adhesive and completing curing of the first adhesive after bringing the first surface of the first item and the second surface of the second item into contact with one another. In some applications, the first item is a prism bar, and the second item is a lens wafer.

In a related aspect, a method includes depositing a first adhesive onto a multitude of areas on a first surface of a prism bar. The first adhesive forms patterns each of which at least partially surrounds a respective region of the first surface where there is no first adhesive. The method includes jetting a second adhesive onto each of the respective regions of the first surface, wherein the second adhesive has a viscosity lower than a viscosity of the first adhesive. The first surface of the prism bar is brought into contact with a surface of a substrate to form a stack. The method also includes curing the first and second adhesives.

In accordance with a further aspect, a method includes placing a multitude of first items into a jig. While the first items are in the jig, a first adhesive is deposited onto a multitude of areas on a first surface of each respective one of the first items, wherein the first adhesive forms patterns each of which at least partially surrounds a respective region of one of the first surfaces where there is no first adhesive. The method includes jetting a second adhesive onto each of the respective regions of the first surfaces, wherein the second adhesive has a viscosity lower than a viscosity of the first adhesive. The first surface of each of the first items is brought into contact with a surface of a wafer to form a stack. The method also includes curing the first and second adhesives. In some implementations, the stack is separated into individual optical light guide elements.

The first adhesive can be deposited, for example, by screen printing or auger valve dispensing techniques.

The present disclosure also describes optical and opto-electronic elements (e.g., an optical light guide element) including first and second surfaces attached to one another by first and second adhesives. The first adhesive can be in a pattern that at least partially surrounds a region where the second adhesive is present, but where there is no first adhesive present. One or more channels extend at least partially through the pattern of the first adhesive. In some implementations, each channel has a width on the order of about 300-500 μm, although other dimensions can be used for some instances.

Some implementations provide one or more of the following advantages. For example, the methods can, in some cases, help reduce the presence of small air bubbles or other bonding voids that otherwise may be introduced into the adhesives. Mechanical robustness can thus be improved in some instances. Reducing the number or presence of bonding voids can, in some cases, help prevent moisture ingress. Further, providing a higher viscosity adhesive around the area(s) where the lower viscosity adhesive is dispensed can help prevent adhesive from overflowing onto optically sensitive or other components, which may become contaminated by the adhesive.

Other aspects, features and advantages will be readily apparent from the following detailed description, the accompanying drawings, and the claims.

BRIEF DESCRIPTION OF THE DRAWINGS

FIG. 11 illustrates a further example of a stack including a prism bar.

FIG. 12 illustrates yet another example of a stack including a prism bar.

DETAILED DESCRIPTION

Figure 1A:
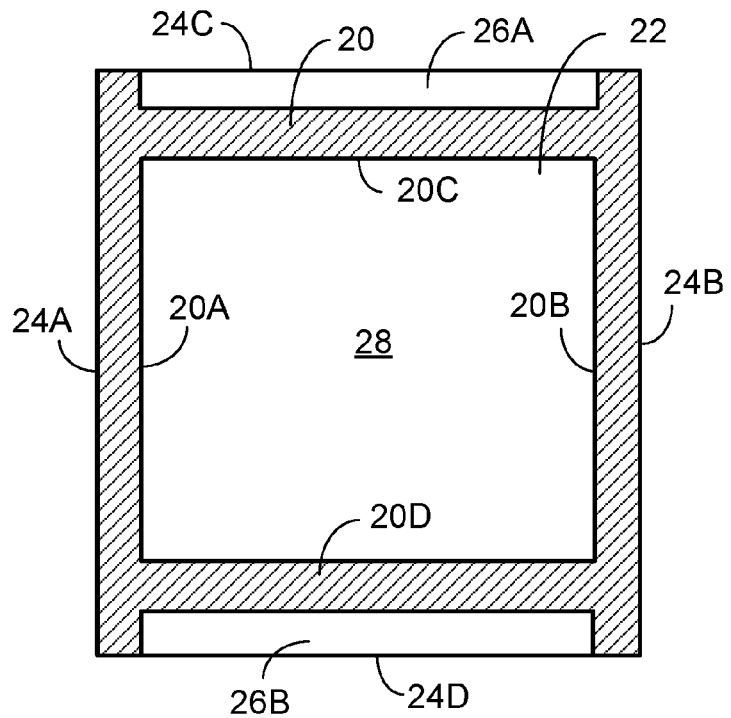
FIG. 1A illustrates an example of a pattern of a first adhesive deposited on the surface of an item.

The present disclosure describes methods of attaching first and second surfaces to one another. The first and second surfaces can be, for example, relatively flat, smooth surfaces. A relatively high-viscosity adhesive pattern is deposited on one of the surfaces (e.g., by screen printing or auger valve dispensing), and then a lower-viscosity adhesive is dispensed (e.g., by jetting) onto an area of the surface substantially surrounded laterally by the higher viscosity adhesive.

Screen printing can employ, for example, a mesh to transfer the adhesive onto a substrate, except in areas made impermeable to the adhesive by a blocking stencil. A blade or squeegee can be moved across the screen to fill the open mesh apertures with adhesive, and a reverse stroke then causes the screen to touch the substrate momentarily along a line of contact. This causes the adhesive to wet the substrate and be pulled out of the mesh apertures as the screen springs back after the blade has passed. Auger valve dispensing can, in some implementations, include depositing the adhesive by using a motor-operated dispensing technique in which a motor rotates an auger valve screw. The adhesive can be pushed onto the auger valve screw, for example, from a feed tube. As the auger screw rotates, the adhesive is dispensed from a needle.

Depending on the implementation, dispense jetting technologies can use, e.g., a mechanically, electrically, or pneumatically actuated piston with a ball tip to impel adhesive through a narrow orifice at the end of the jet nozzle. For example, air pressure can raise the piston, allowing adhesive to flow around it into the nozzle. When air pressure is removed, a spring returns the piston so the ball again sits in the nozzle orifice. As the ball re-seats, it shoots a droplet of adhesive out the end of the nozzle. Adjusting the nozzle orifice, air and fluid pressure control droplet size. Precise heat control at the nozzle can maintain the adhesive temperature at an optimum viscosity for jetting, and can reduce variation in production. Small dots propelled from the jetting mechanism at rates, for example, up to 200 Hz in various software-controlled modes (e.g., distance-based, time-based, fixed number of dots per line, or continuous line with breaks) enable the construction of many different sizes and shapes of dots and lines. Because the momentum of the adhesive comes from the jetting action, proximity to the substrate (dispense gap) can be less critical than needle dispensing. Jetting can, in some cases, be faster than needle dispensing. The jet nozzle can build up a dot quickly by applying many shots of low-viscosity adhesive in the same location without disturbing the previously dispensed high-viscosity adhesive.

In some implementations, details of the screen printing, auger valve dispensing and/or dispense jetting techniques may differ from the specific details described above.

In the present context, adhesive refers to a material that bonds two previously discrete items so the resulting bonded assembly can operate within the range of thermal and mechanical stresses that can be expected within the product's use. Examples of suitable adhesives are epoxies.

In some implementations, the viscosity of the higher viscosity adhesive is in the range of 8,000 mPas to 20,000 mPas. In some implementations, the viscosity of the lower viscosity adhesive is less than or equal to 3,000 mPas. Thus, in some cases, the higher viscosity adhesive is six times as great as the lower viscosity adhesive. Adhesives having values of viscosity different from the foregoing values can be used in some instances. Further, in some implementations, the lower and higher viscosity adhesives can be composed of the same material (e.g., the same epoxy), but have respective viscosities that differ from one another because they are applied at different temperatures. For example, an adhesive applied (e.g., deposited) at a first temperature can serve as the lower viscosity adhesive, and the same adhesive applied (e.g., jetted) at a second different temperature can serve as the higher viscosity adhesive.

After both adhesives are dispensed onto one of the surfaces, the two surfaces are brought into contact with one another and pressed together. The adhesives can be cured in one or more curing steps (e.g., UV-curing, heat-curing or both).

In the following description, screen printing is used as an example of a technique for depositing the higher viscosity adhesive. However, in some implementations, other techniques, such as auger valve dispensing, can be used to deposit the higher viscosity adhesive.

FIGS. 1A, 2A, 3A and 4A illustrate examples of patterns for the screen-printed high-viscosity adhesive 20 on a surface 22 of a first item having edges 24A, 24B, 24C, 24D. In the example of FIG. 1A, the screen-printed high-viscosity adhesive 20 is provided as straight lines 20A, 20B along two opposite edges 24A, 24B of the surface 22. Additional screen-printed high-viscosity adhesive 20 is provided along straight lines 20C, 20D that intersect the lines 20A, 20B. A respective gap 26A, 26B can be present between each edge 24C, 24D of the surface 22 and the adjacent line 20C, 20D of adhesive 20. The adhesive 20 thus laterally surrounds an interior region 28, where there is no high-viscosity adhesive 20, and where the lower-viscosity adhesive subsequently can be dispensed by jetting.

Figure 1B:
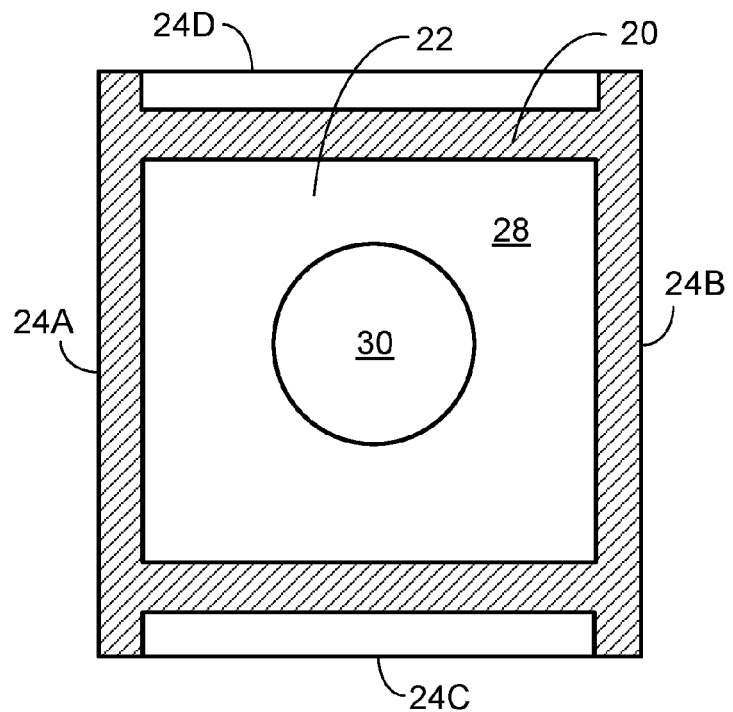
FIG. 1B illustrates a second lower-viscosity adhesive jetted onto the surface of the item of FIG. 1A.

As shown in FIG. 1B, the lower-viscosity adhesive 30 can be dispensed by jetting at or near the center of the interior region 28. The high-viscosity adhesive 20 can serve as a wall at or near the edges 24A-24D of the surface 22 to help prevent the lower-viscosity adhesive 30 from overflowing and spilling onto sensitive areas that could thereby become contaminated. When the surface of a second item (not shown in FIGS. 1A and 1B)) is brought into contact with the surface 22 of the first item, the lower-viscosity adhesive 30 gradually spreads across the surface 22 so that it covers the interior region 28 of the surface 22 through capillary forces.

Figure 2A:
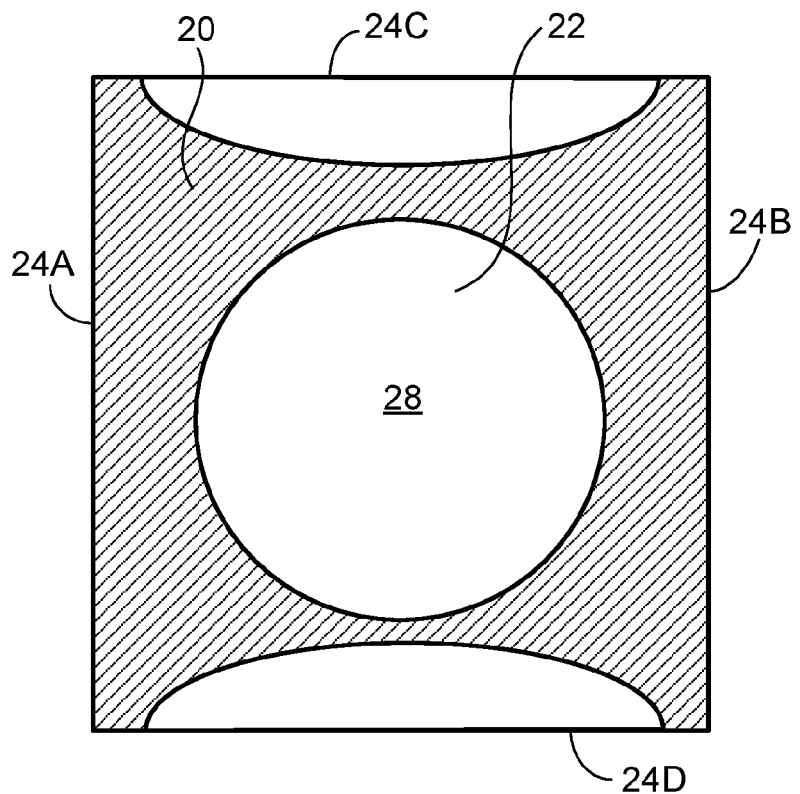
FIG. 2A illustrates another example of a pattern for a first adhesive deposited on the surface of an item.
Figure 2B:
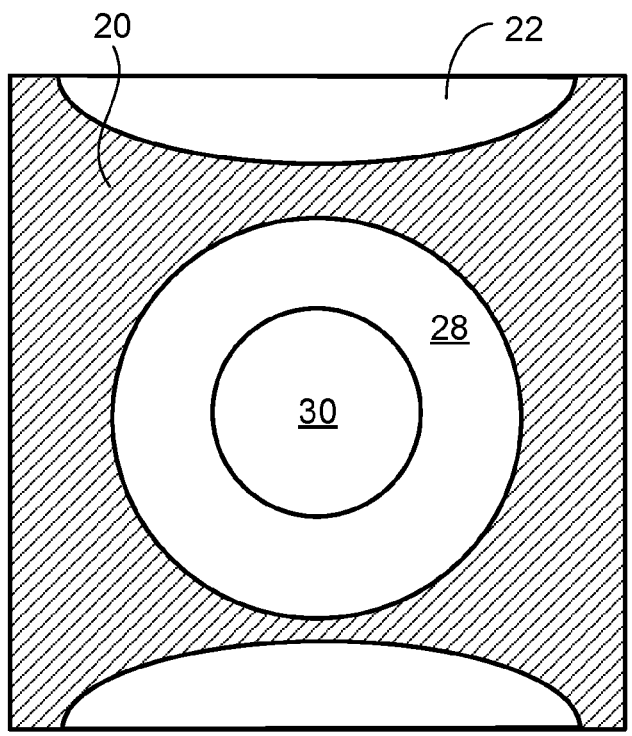
FIG. 2B illustrates a second lower-viscosity adhesive jetted onto the surface of the item of FIG. 2A.

In the example of FIG. 2A, the screen-printed high-viscosity adhesive 20 is provided on the surface 22 of the first item, including along at least two of its edges 24A, 24B. Here too, the screen-printed high-viscosity adhesive 20 laterally surrounds an interior region 28, where the lower-viscosity adhesive 30 is subsequently dispensed by jetting (see FIG. 2B). In this example, the interior region 28 has a circular shape whose boundary (defined by the surrounding high-viscosity adhesive 20) is further away from the edges 24A-24D and from the corners of the surface 22. Such a pattern for the screen-printed high-viscosity adhesive 20 can help reduce the presence of micro bubbles in the vicinity of the corners of the surface 22 when the surface of the second item (not shown in FIGS. 2A and 2B) is brought into contact with the surface 22 of the first item, which causes the lower-viscosity adhesive 30 to spread and cover the interior region 28.

Figure 3A:
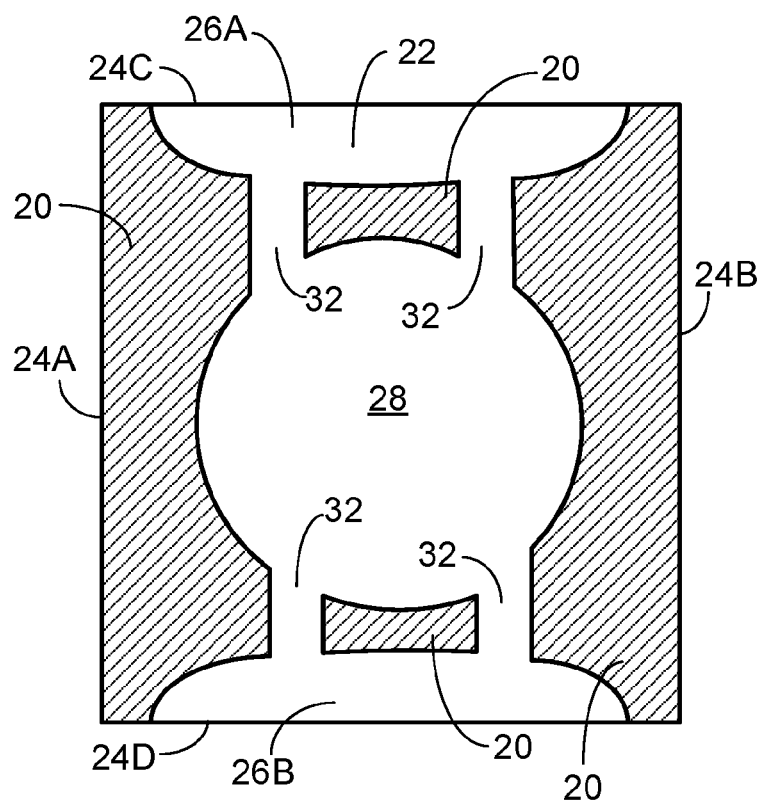
FIG. 3A illustrates a further example of a pattern for a first adhesive deposited on the surface of an item.
Figure 3B:
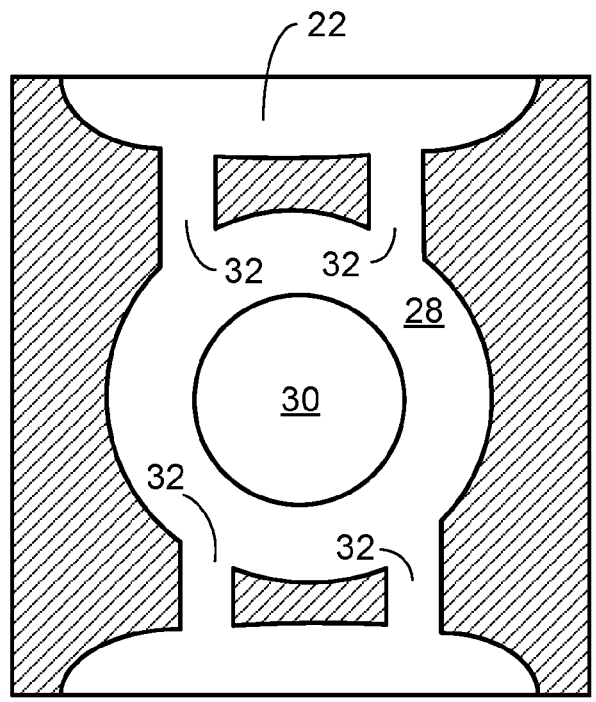
FIG. 3B illustrates a second lower-viscosity adhesive jetted onto the surface of the item of FIG. 3A.
Figure 4A:
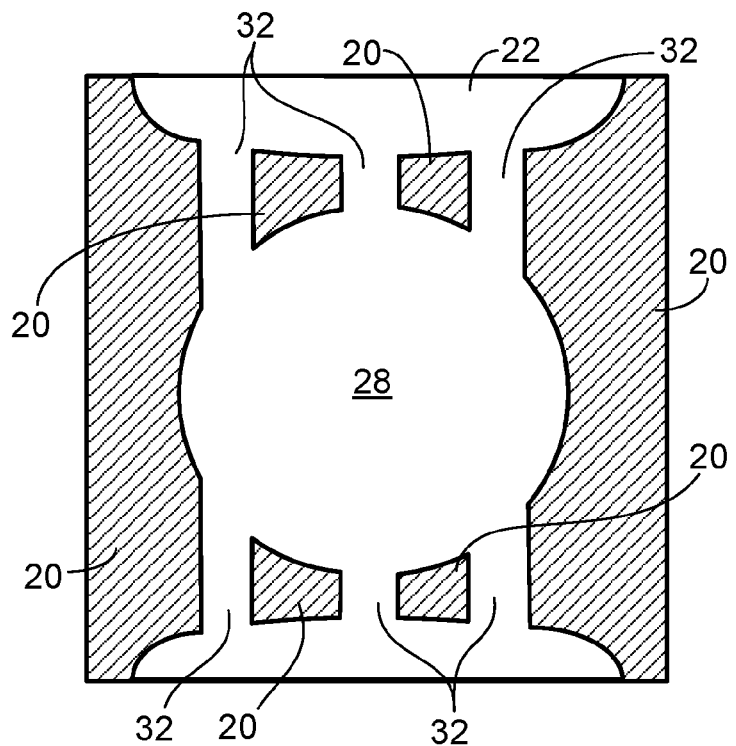
FIG. 4A illustrates yet another example of a pattern for a first adhesive deposited on the surface of an item.
Figure 4B:
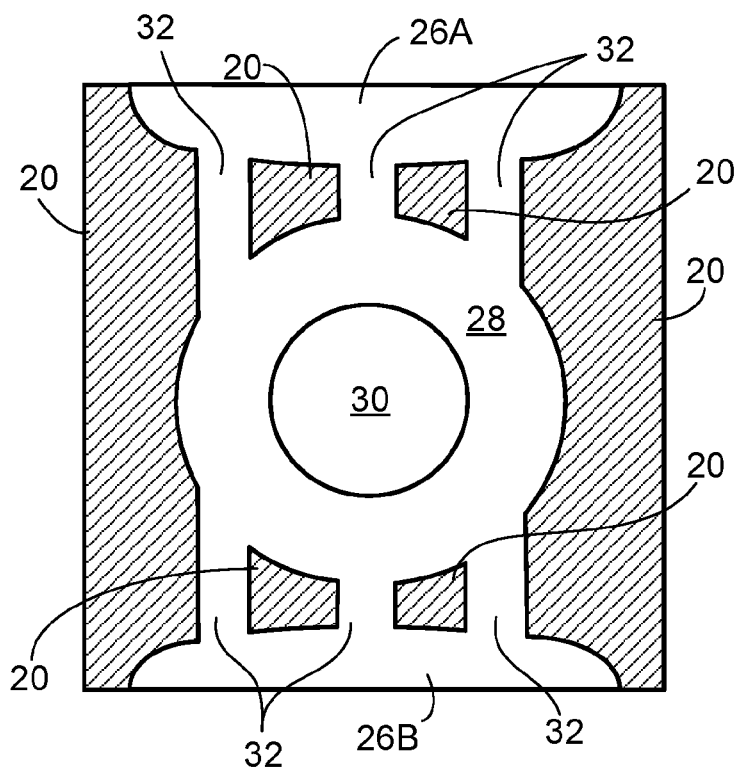
FIG. 4B illustrates a second lower-viscosity adhesive jetted onto the surface of the item of FIG. 4A.

In the example of FIG. 3A, the screen-printed high-viscosity adhesive 20 is provided on the surface 22 of the first item, including along at least two of its edges 24A, 24B. Here too, the screen-printed high-viscosity adhesive 20 substantially laterally surrounds an interior region 28, where the lower-viscosity adhesive 30 is subsequently dispensed by jetting (see FIG. 2B). In this example, however, the screen-printed high-viscosity adhesive 20 is provided in a pattern that has channels 32 (i.e., areas where no high-viscosity adhesive 20 is provided) extending from the interior region 28 toward the gaps 26A, 26B near the edges 24C, 24D. When the surface of the second item (not shown in FIGS. 3A and 3B) is brought into contact with the surface 22 of the first item, the lower viscosity adhesive 30 may migrate somewhat into the channels 32, which can allow micro bubbles to be eliminated from the interior region 28, while also reducing the presence of micro bubbles in the vicinity of the corners of the surface 22. Although FIGS. 3A, 3B show four channels 32, other implementations may include a fewer number of channels (e.g., one, two or three) or a greater number of channels. For example, FIGS. 4A and 4B illustrate an implementation having six channels 32 extending from the interior region 28. In some implementations, the width of each channel is on the order of several hundred microns (µm), for example, 100-500 µm (e.g., 300 µm). The dimensions may vary for other implementations.

Figure 5:
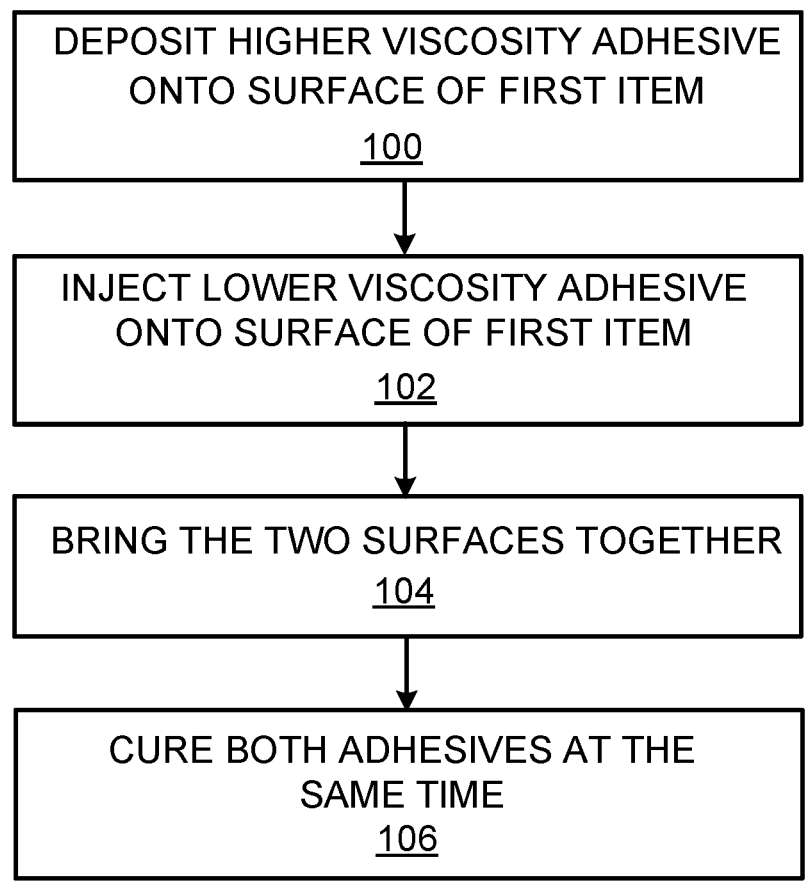
FIG. 5 is a flow chart of a first method of attaching together the surfaces of two items.
Figure 6:
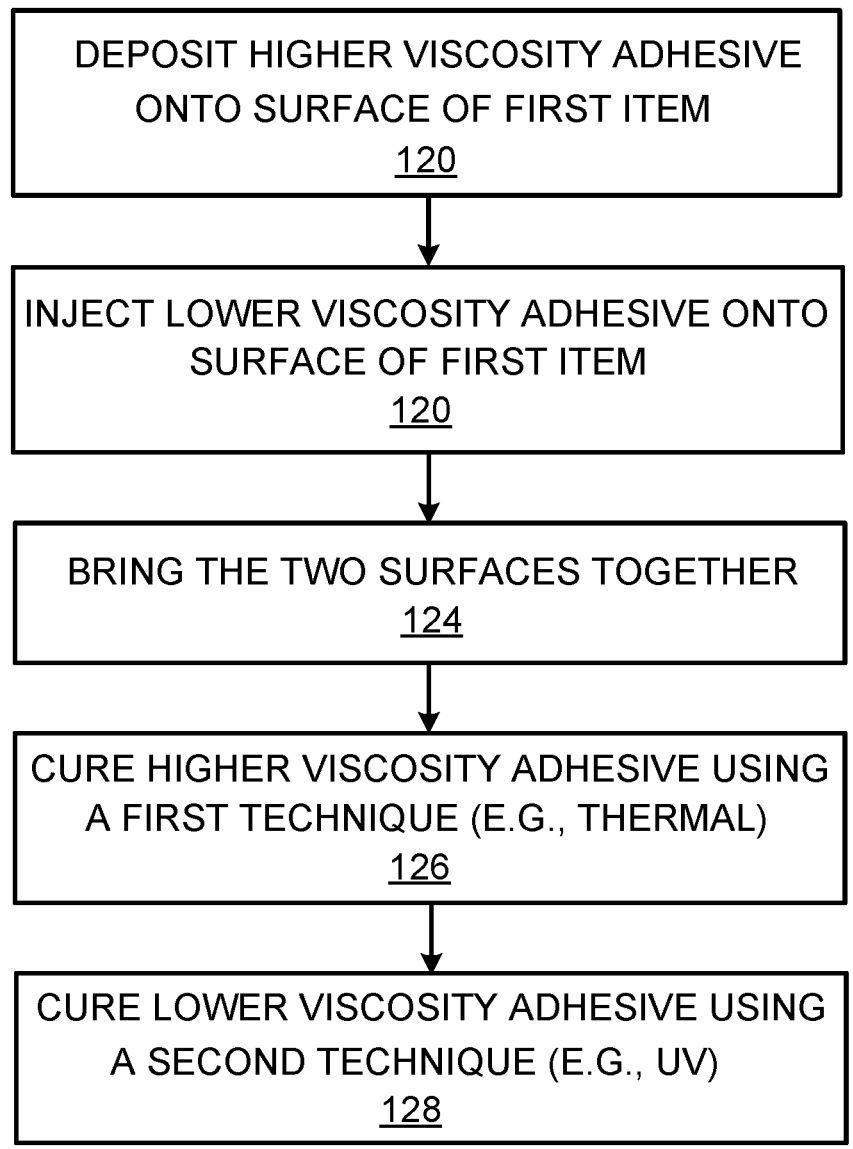
FIG. 6 is a flow chart of a second method of attaching together the surfaces of two items.
Figure 7:
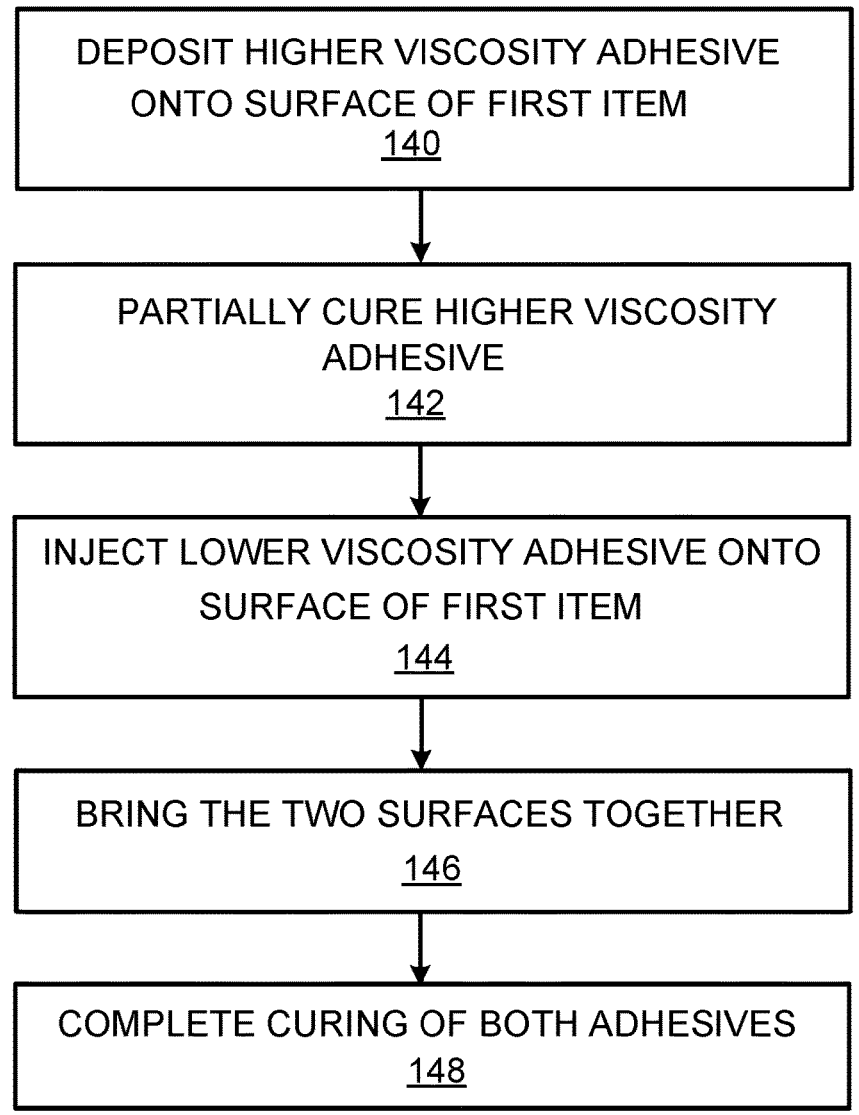
FIG. 7 is a flow chart of a third method of attaching together the surfaces of two items.

The high-viscosity and lower-viscosity adhesives 20, 30 can be cured in one or more curing steps (e.g., UV-curing, heat-curing or both). In some implementations, curing takes place after the surfaces of the two items are brought into contact with one another. In some implementations, partial curing make take place before the surfaces of the two items are brought into contact with one another. FIGS. 5, 6 and 7 illustrate examples of the foregoing processes.

As shown in FIG. 5, in accordance with a first process, the higher viscosity adhesive 20 is deposited (e.g., by screen-printing or auger valve dispensing) onto the surface 22 of the first item (100). Then, the lower viscosity adhesive 30 is injected (e.g., by jetting) onto the surface 22 of the first item (102). The two surfaces to be attached (i.e., the surface 22 of the first item and a surface of a second item) are brought into contact with one another (104). Then, both adhesives 20, 30 are cured, for example, simultaneously by UV-curing and/or thermal curing (106).

In some cases, as shown in FIG. 6, after depositing (e.g., by screen-printing or auger valve dispensing) the higher viscosity adhesive 20 is onto the surface 22 of the first item (120) and injecting (e.g., by jetting) the lower viscosity adhesive 30 onto the surface 22 of the first item (122), the two surfaces to be attached (i.e., the surface 22 of the first item and a surface of a second item) are brought into contact with one another (124). The higher viscosity adhesive 20 can be cured by a first curing technique (e.g., thermal curing) (126), and the lower viscosity adhesive 30 can be cured by a second technique (e.g., UV curing) (128). The heat applied during curing of the higher viscosity adhesive 20 can reduce the viscosity of the other adhesive 30 even further, thereby allowing more voids to be filled as the lower viscosity adhesive 30 spreads across the interior region 28 of the surface 22.

FIG. 7 shows yet another example according to which the higher viscosity adhesive 20 is deposited (e.g., by screen-printing or auger valve dispensing) onto the surface 22 of the first item (140), and then is partially cured (e.g., thermal or UV curing) (142). Next, the lower viscosity adhesive 30 is injected (e.g., by jetting) onto the surface 22 of the first item (144). The two surfaces to be attached (i.e., the surface 22 of the first item and a surface of a second item) are brought into contact with one another (146). Then, both adhesives 20, 30 are fully cured, for example, by UV-curing and/or thermal curing (148).

Figure 8A:
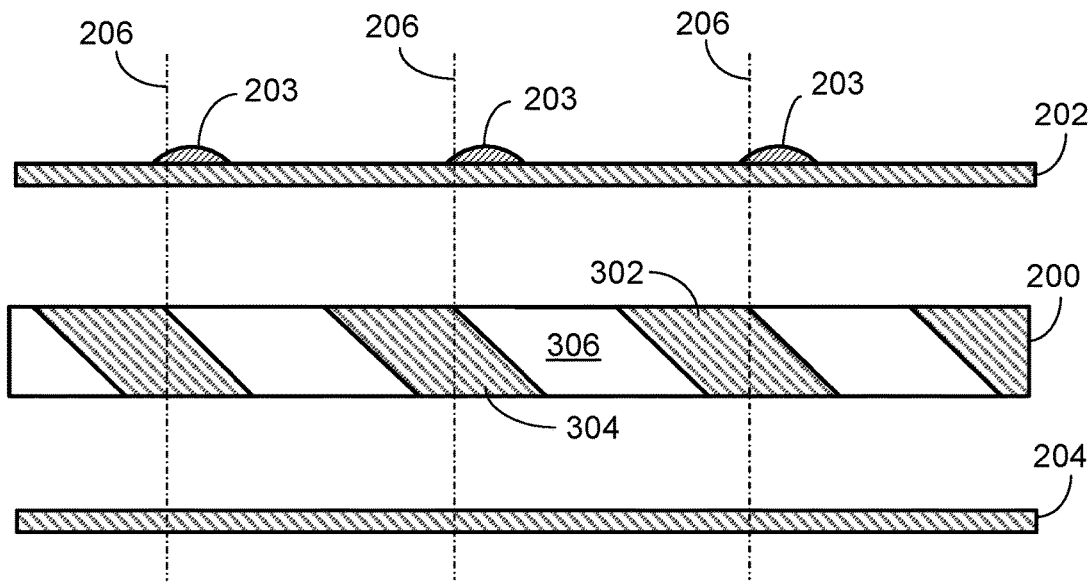
FIG. 8A illustrates formation of a stack including a prism bar.
Figure 8B:
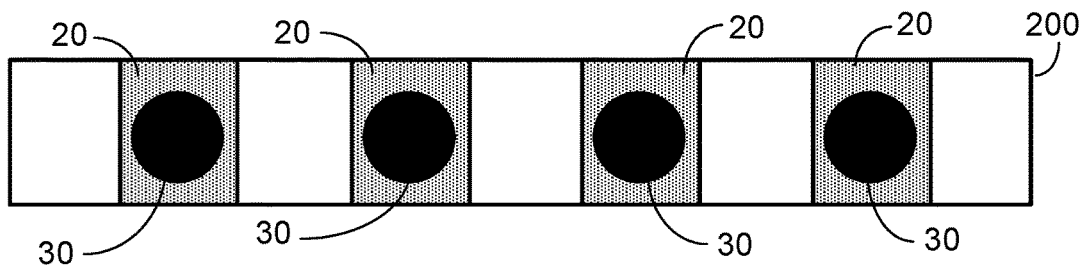
FIG. 8B illustrates an example of adhesives on the upper surface of the prism bar.

The methods described here can be particularly suitable for manufacturing optical light guide elements as part of a wafer-level process, in which many (e.g., tens, hundreds or even thousands) of optical light guide elements are fabricated at the same time in parallel. For example, as shown in FIG. 8A, some fabrication processes include attaching prism bars 200 to a lens wafer 202 (e.g., that includes lenses 203) and a transparent support wafer 204. Although only a single prism bar 200 is illustrated in FIG. 8, in some manufacturing processes, many prism bars 200 are placed, for example, into a jig, and then the lens wafer 202 is attached to one side (e.g., the upper side in FIG. 8A) of the prism bars using one of the attachment methods described in connection with FIGS. 1-7. FIG. 8B illustrates a top view of a prism bar 200 whose surface has a higher viscosity adhesive pattern 20 formed, e.g., by screen-printing or auger valve dispensing, and a lower viscosity adhesive pattern 30 formed by jetting. The support wafer 204 can be attached to the opposite side (e.g., the lower side in FIG. 8A) of the prism bars 200 using the same or another one of the attachment methods described in connection with FIGS. 1-7.

When attaching the lens wafer 202 to the prism bars 200, the higher viscosity and lower viscosity adhesives 20, 30 can be applied (e.g., by screen-printing or auger valve dispensing, and jetting, respectively) to the surface of the prism bars 200 to which the lens wafer 202 is being attached. Likewise, when attaching the support wafer 204 to the prism bars 200, the higher viscosity and lower viscosity adhesives 20, 30 can be applied (by screen-printing and jetting, respectively) to the surface of the prism bars 200 to which the support wafer 204 is being attached. In other implementations, the adhesives 20, 30 can be applied (by screen-printing or auger valve dispensing, and jetting, respectively) to the appropriate surfaces of the wafers 202, 204 instead of being applied to the prism bars 200.

Figure 9:
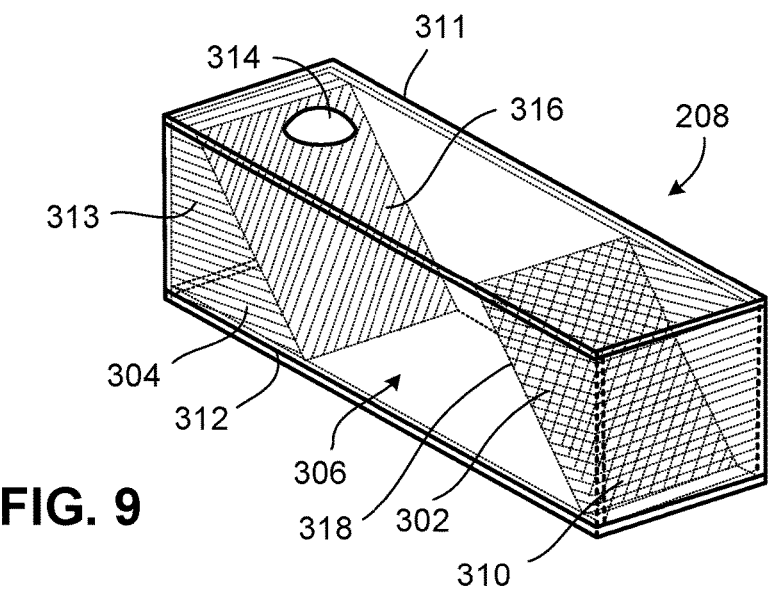
FIG. 9 illustrates an example of an optical light guide element.

After the wafers 202, 204 are attached to the prism bars 200, the resulting stack can be separated along dicing lines 206 to form individual optical light guide elements 208, an example of which is shown in FIG. 9.

The illustrated optical light guide element 208 includes two prisms 302, 304 separated from one another by a cavity 306. The cavity 306 is enclosed by outer side panels 310, 311, 312, 313. The upper panel 311 on the top side of the optical light guide element 208 corresponds to a section of the lens wafer 202 that was attached to the upper side of the prism bar 200 (see FIG. 8A). Likewise, the lower panel 312 on the underside of the optical light guide element 208 corresponds to a section of the other wafer 204 that was attached to the underside of the prism bar 200 (see FIG. 8A). In the illustrated example, the upper panel 311 includes a lens element 314. Light entering the optical light guide element 208 through the lens element 314 is reflected by a first reflective face 316 of the prism 304, travels through the cavity 306 toward a second reflective face 318 of the prism 302, which reflects the light out of the light guide element 208 through its lower panel 312.

Figure 10:
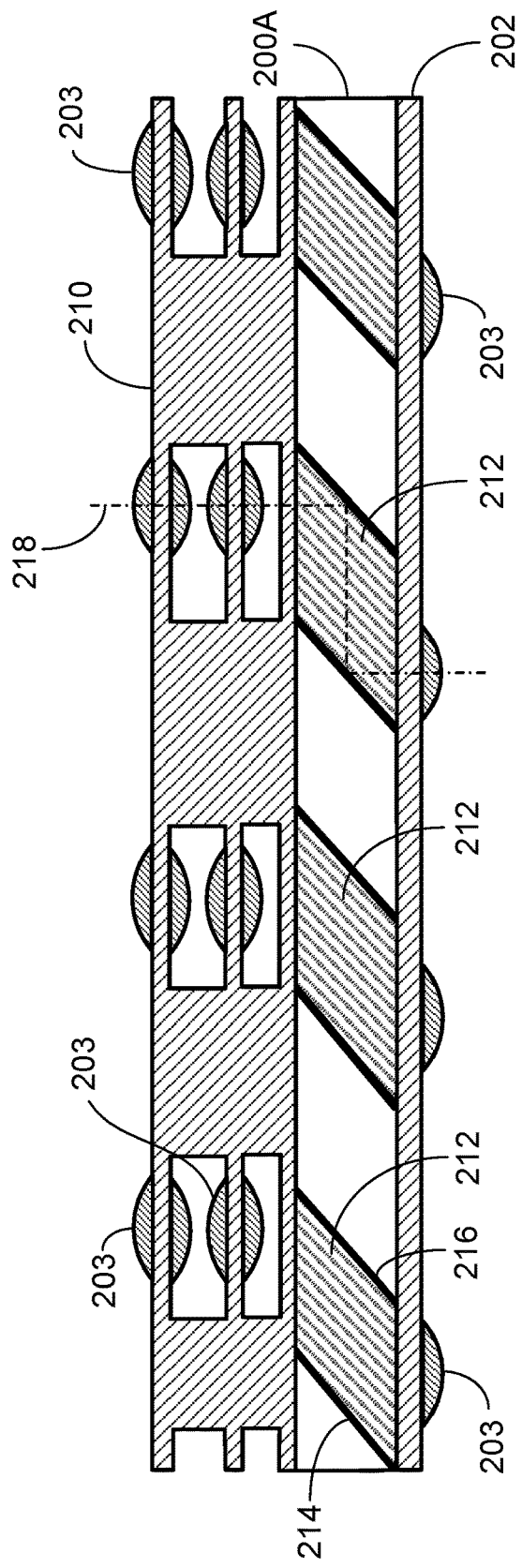
FIG. 10 illustrates another example of a stack including a prism bar.

The attachment methods described in connection with FIGS. 1-7 can be used to form other types of stacks as well. For example, FIG. 10 shows a stack that includes a prism bar 200A attached on one side (e.g., the lower side in FIG. 10) to a first lens wafer 202 and attached on the opposite side (e.g., the upper side in FIG. 10) to a second lens wafer. In this example, the prism bar 200A has regions 212 of optically transparent material on which reflective coatings 214, 216 are present, and each of the lens wafers 202, 210 has respective lenses 203. The techniques for applying the high and low viscosity adhesives 20, 30 can be used to attach each of the lens wafers 202, 210 to the prism bar 200A. In some cases, multiple prism bars 200A can be held in a jig, and the lens wafers 202, 210 can be attached to the prism bars using any of the various attachment described above. The stack then can be separated (e.g., by dicing) into multiple optical light guide elements, each of which has a respective light path 218 into, through and out of the optical light guide element.

FIG. 11 illustrates yet another example of a stack including a prism bar 200B attached on one side (e.g., the upper side in FIG. 11) to a lens wafer 222 including lenses 203 and attached on the other side (e.g., the lower side in FIG. 11) to a second wafer 220 on which are mounted opto-electronic components (e.g., light emitters such as LEDs or laser chips). The prism bar 200B can be similar to the prism bar 200 of FIG. 8A, including prisms 302, 304 separated from one another by a cavity 306. The surfaces 316, 318 of the prisms 302, 304 facing the cavity 306 should be reflective and may, in some cases, be coated with a reflective layer. The lens wafer 222 can be composed, for example, of a non-transparent material that includes transparent regions 320 through which light can pass. The second wafer 220 can be composed in part, for example, of a non-transparent dielectric material such a printed circuit board (PCB). The second wafer 220 also includes transparent regions 322 through which light can pass. In the illustrated example, the opto-electronic components 224 are attached to contact pads that are in electrical contact with further contact pads 324 outside the cavity 306 by way of vias 326 extending through the wafer 220.

The prism bar 200B can be attached to the wafers 220, 222 using any of the methods described in connection with FIGS. 1-7. The stack then can be separated (e.g., by dicing) into multiple optical light guide elements, each of which has a respective light path 328 into, through and out of the optical light guide element. Each opto-electronic component 224 can be supplied with power and/or can be controlled from outside the optical light guide element. For implementations in which the opto-electronic component 224 is a light emitter, light produced by the light emitter can travel along an optical path 330 parallel to the optical path 228.

FIG. 12 illustrates another example, which is similar to the example of FIG. 11, except that each opto-electronic component (e.g. light emitters) 224 is mounted to an inclined surface of a respective one of the prisms 302, 304. The prism bar 200C can be attached to the wafers 220A, 222A using any of the methods described in connection with FIGS. 1-7. The stack then can be separated (e.g., by dicing) into multiple optical light guide elements, each of which has a respective light path 328 into, through and out of the optical light guide element. In some cases, the transparent regions 320 and lenses 203 of the first lens wafer 222A may be made slightly larger than in the implementation of FIG. 11 to allow more of the light produced by the light emitters 224 to pass out of the resulting optical light guide elements. The second wafer 220A can be, for example a lens wafer composed, in part, of a non-transparent material such as PCB and including transparent regions 320 over which respective lenses 203 are disposed.

While the foregoing methods of attaching the surface of one item to the surface of another item (or multiple items) can be particularly suitable for manufacturing optical light guide elements in wafer level processes, the methods also can be used in other contexts and applications as well.

Various modifications can be made within the spirit of this disclosure. Also, in some cases, features described above in connection with different implementations can be combined in the same implementation. Accordingly, other implementations are within the scope of the claims.

What is claimed is:

1. A method comprising:
    depositing a first adhesive onto a plurality of areas on a first surface of a prism bar, wherein the prism bar includes a plurality of prisms separated from one another by respective cavities, each of the prisms having a plurality of inclined reflective surfaces, the first adhesive forming patterns each of which at least partially surrounds a respective region of the first surface where there is no first adhesive;
    jetting a second adhesive onto each of the respective regions of the first surface, wherein the second adhesive has a viscosity lower than a viscosity of the first adhesive;
    bringing the first surface of the prism bar into contact with a surface of a substrate to form a stack;
    curing the first and second adhesives; and
    separating the stack into a plurality of optical light guide elements by dicing through the prisms.

2. The method of claim 1 wherein the first adhesive is applied to the first surface so as to form patterns such that there are one or more channels extending outward from each region of the first surface where there is no first adhesive, wherein there is no first adhesive in the one or more channels.

3. The method of claim 1 including curing the first and second adhesives at the same time.

4. The method of claim 1 including curing the first adhesive by a first curing technique and curing the second adhesive by a different second curing technique.

5. The method of claim 1 including:
partially curing the first adhesive before jetting the second adhesive onto the respective regions of the first surface; and
curing the second adhesive and completing curing of the first adhesive after bringing the first surface of the prism bar and the second surface of the substrate into contact with one another.

6. The method of claim 1 wherein the substrate includes a wafer having lenses formed thereon.

7. The method of claim 1 wherein the first adhesive is deposited by screen printing or auger valve dispensing.

8. The method of claim 1 wherein the first and second adhesives are composed of a same material, and wherein the first adhesive is deposited at a first temperature, and the second adhesive is jetted at a second temperature different from the first temperature.

9. The method of claim 1 further comprising:
placing the prism bar into a jig prior to depositing the first adhesive;
wherein the first adhesive is deposited onto the plurality of areas on the first surface of each respective one of the prisms while the prism bar is in the jig.

10. The method of claim 1 wherein the first adhesive has a viscosity of at least 8,000 mPas.

11. The method of claim 1 wherein the first adhesive has a viscosity in a range of 8,000 mPas to 20,000 mPas.

12. The method of claim 1 wherein the second adhesive has a viscosity equal to or less than 3,000 mPas.

13. The method of claim 1 wherein the first adhesive is applied to the first surface so as to cover corner areas of the first surface.

14. The method of claim 1 including thermally curing the first adhesive and applying UV radiation to cure the second adhesive.

* * * * *